May 16, 1967        D. LUPOVICI        3,319,397

CONVEYOR TYPE CONTAINER FILLING AND SEALING MACHINE

Filed Sept. 14, 1964        5 Sheets-Sheet 1

INVENTOR
David LUPOVICI

BY Pierre Esperance

PATENT AGENT

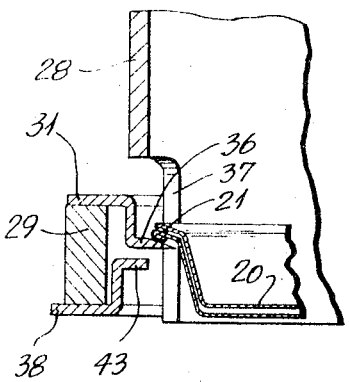
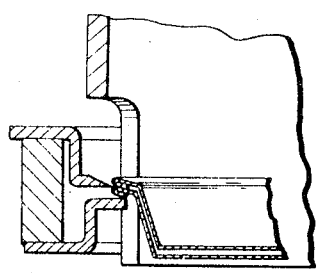
Fig. 3
Fig. 4
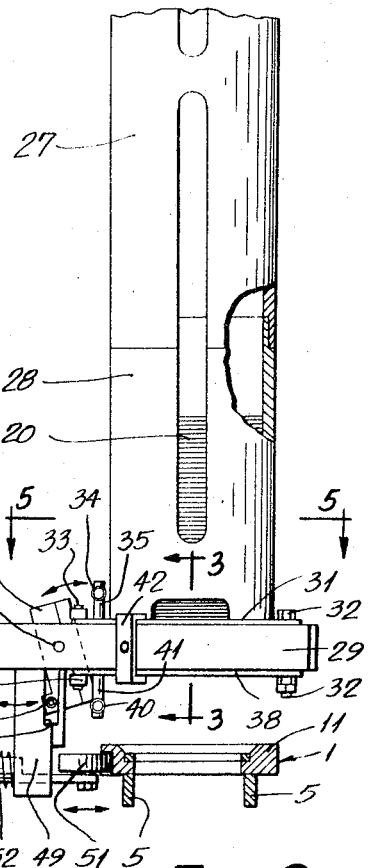
Fig. 2
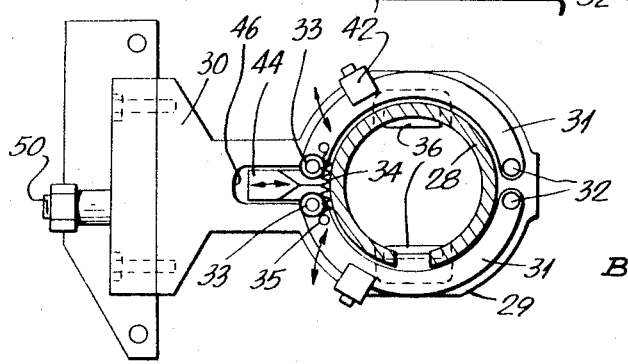
Fig. 5
INVENTOR
David LUPOVICI
BY Pierre Esperance
PATENT AGENT May 16, 1967   D. LUPOVICI   3,319,397
CONVEYOR TYPE CONTAINER FILLING AND SEALING MACHINE
Filed Sept. 14, 1964   5 Sheets-Sheet 3
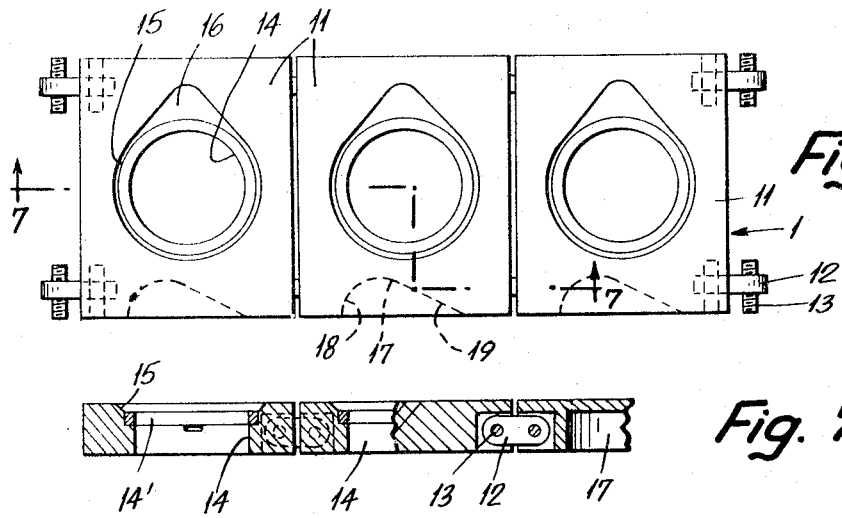
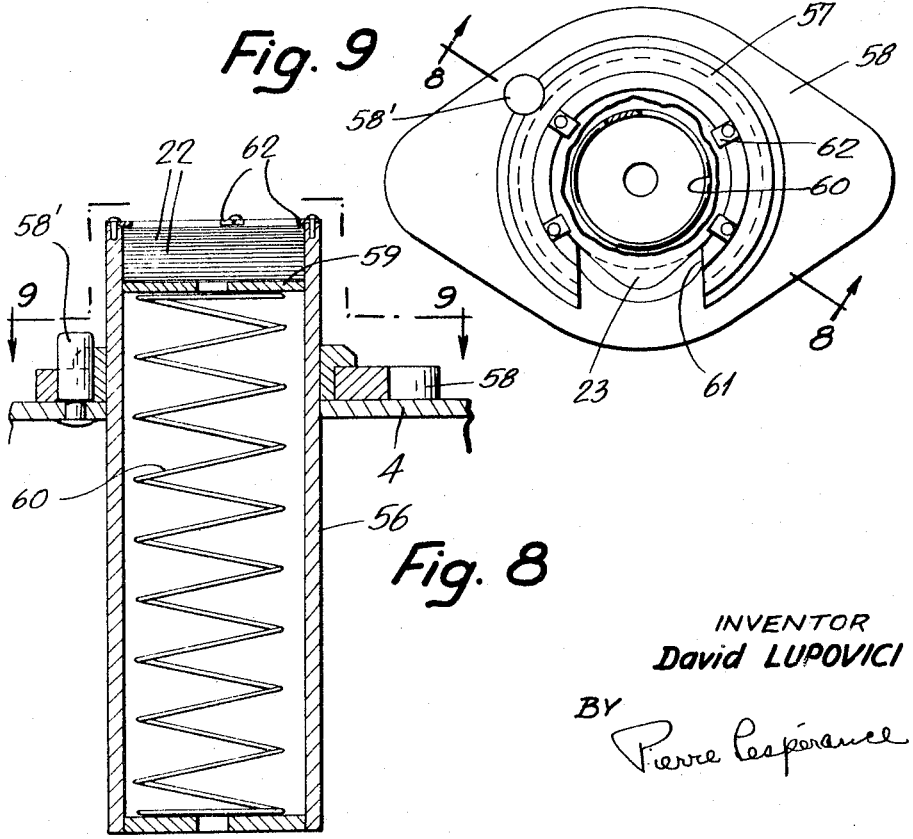
INVENTOR
David LUPOVICI
BY
Pierre Lesperance
PATENT AGENT INVENTOR
David LUPOVICI

BY

Pierre Lespérance

PATENT AGENT

INVENTOR
David LUPOVICI

BY Pierre Lesperance

PATENT AGENT

United States Patent Office 3,319,397
Patented May 16, 1967

3,319,397
CONVEYOR TYPE CONTAINER FILLING AND
SEALING MACHINE
David Lupovici, 7482 Spring Road, Cote St. Luc,
Quebec, Canada
Filed Sept. 14, 1964, Ser. No. 396,326
8 Claims. (Cl. 53—282)

The present invention relates to an automatic machine for filling and hermetically sealing aluminum-foil containers with food products in powder or jelly condition.

It has been known for some time to package food products in individual portions in aluminum-foil containers having a heat sealed plastic laminated aluminum cover. These containers protect the food against oxidation and moisture loss.

Machines for filling and capping said containers are already known, but most of these machines are complicated in their construction and are therefore expensive, and certain parts of their mechanism often fail to operate properly, such as the means for dispensing the empty containers in proper position onto the container transfer means, the cap transfer means and the heat sealing means. Moreover, these machines have a relatively small capacity compared to their size.

It is, therefore, the general object of the present invention to provide a container filling and sealing machine, of simplified and improved construction, which operates effectively and practically without failure in a completely automatic manner and which has a relatively large capacity compared to its size and price.

A more specific object of the present invention resides in the provision of a machine of the character described, using a conveyor chain for transferring the containers between a container dispensing station, a container filling station, a container capping station, a container cap sealing station, and a filled container ejecting station, and in which new and improved means are used for dispensing individual containers successively onto the conveyor chain, said means being directly controlled by the conveyor chain itself, so as to dispense the containers in exact register with the conveyor chain container receiving sockets.

Another object of the present invention resides in the provision, in a machine of the character described, of new and improved means for transferring individual caps and depositing the same onto the filled containers on the conveyor chain.

Another specific object of the present invention resides in the provision of an improved mounting for the cap sealing means whereby said means can be easily made accessible for cleaning, repair and the like, without disassembling the machine.

The foregoing and other important objects of the present invention will become more apparent during the following disclosure and by referring to the drawings, in which:

FIGURE 2 is a partial side elevation of the container dispensing means, shown partially cut away and also showing the conveyor chain in cross section;

FIGURE 3 is a partial longitudinal section, taken along line 3—3 of FIGURE 2;

FIGURE 4 is a section similar to that of FIGURE 3, but at another stage of the operation of the ejecting mechanism;

FIGURE 5 is a plan section, taken along line 5—5 of FIGURE 2;

FIGURE 6 is a plan view of part of the conveyor chain;

FIGURE 7 is a longitudinal section, taken along line 7—7 of FIGURE 6;

FIGURE 8 is a longitudinal section of the cap magazine and taken along line 8—8 of FIGURE 9;

FIGURE 9 is a top plan view of the cap magazine, with parts broken away, and taken along line 9—9 of FIGURE 8;

Referring now more particularly to the drawings in which like reference characters indicate like elements throughout, FIGURE 1 shows a general view of the machine.

Figure 1:
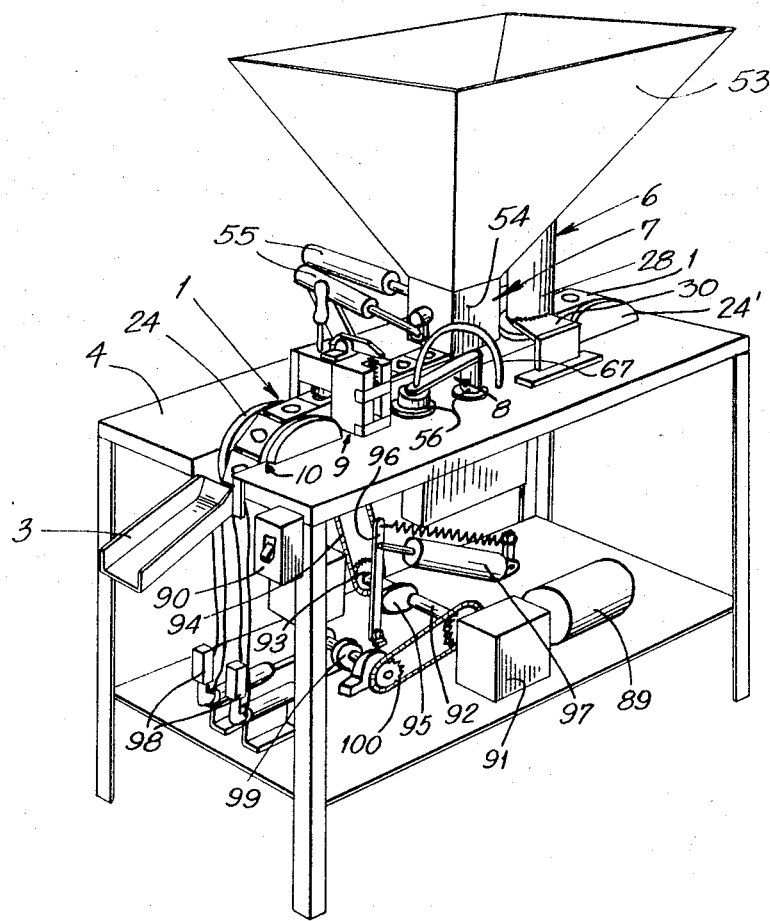
FIGURE 1 is a perspective view of the machine in accordance with the present invention.

An endless conveyor chain 1 is mounted on similar end wheels 24, 24'. Said end wheels move the top run of the endless chain 1 in the direction of the discharge tray 3.

The top run of the endless conveyor chain 1 is disposed slightly above table top 4 and is supported for horizontal movement by means of spaced rails, shown at 5 in FIGURE 2.

Conveyor chain 1 receives empty containers at the container dispensing station, generally indicated at 6, transfers said containers successively to a filling station, indicated at 7; the filled containers are then transferred to a capping station, indicated at 8, and the caps are heat sealed at a sealing station, indicated at 9, and finally the filled and sealed containers are discharged onto the tray 3 at the discharge station indicated at 10.

The endless conveyor chain 1 is shown in more details in FIGURES 6 and 7. It consists of a series of plates 11 disposed side by side and pivotally connected to one another by means of links 12 and bolts 13. Each plate 11 has a central circular opening 14 with a flared top rim 15, defining on one side a triangular shallow cavity 16. A removable wear ring 14' is fitted in opening 14.

One lateral face of each plate 11 on one side of the conveyor chain, is provided with a notch 17, of a symmetrical shape, the upstream edge 18 being nearly at right angles to the lateral face of the plate, while the downstream edge 19 makes a very small angle with said lateral face.

Openings 14 of plate 11 form sockets for receiving aluminum-foil containers, indicated at 20 in FIGURES 3 and 4. Said containers 20 are relatively shallow and circular with an outwardly extending circular flange 21, adapted to seat on the flared top rim 15 of the socket 14.

The caps or covers for the containers 20 are shown in FIGURES 8 and 9 and consist of a thin aluminum foil 22, laminated with paper and a thermo-plastic, the latter layer forming means for heat sealing the cap to the flange 21 of the container 20.

The cap 22 has on one side a triangularly shaped pull tab 23, adapted to fit in the shallow cavity 16 of plate 14 of the conveyor chain 1.

Figure 13:
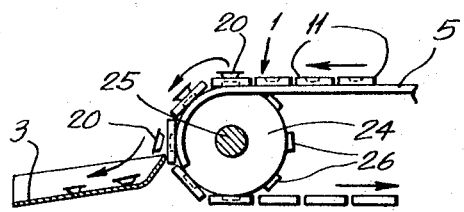
FIGURE 13 is a side elevation of the discharge end of the conveyor chain, the associated discharging tray being shown in longitudinal section.

The conveyor chain 1 is trained at the two ends of the loop made thereby, on a driving wheel 24 and an idle wheel 24', the driving wheel being shown in FIGURE 13 at 24 and located at the discharge station 10. Driving wheel 24 is mounted on a driving shaft 25 and is provided at its periphery with spaced radially protruding circular bosses 26, adapted to enter openings 14 of the conveyor chain plates 11 to engage and eject the filled containers 20. The ejected containers drop on the discharge tray 3, as shown in FIGURE 13.

The idle wheel 24' is similar to the driving wheel 24, except that it need not be provided with bosses 26.

Immediately downstream from the idle wheel, is located the container dispensing station 6 which comprises the mechanism shown in FIGURES 2 to 5 inclusive.

The empty containers 20 are nested one within the other and stacked within a cylindrical magazine consisting of a removable upper section 27 and a lower section 28, which is secured at its lower end within a ring-like frame member 29, having an integral lateral extension 30 forming a bracket secured to the table top 4 and maintaining the magazine vertically above and spaced from the conveyor chain 1, so that the containers 20 are in exact register with an aligned central opening 14 of a plate 11.

An upper pair of diametrically opposed arcuate lever members 31 are mounted on top of frame member 29 around the lower magazine section 28. These arcuate members 31 are pivoted to frame member 29 at 32, away from bracket 30, and their free ends are provided with rollers 33. Levers 31 are urged towards each other by a tension spring 34 interconnecting two posts 35 secured to the respective levers 31 near rollers 33.

Each lever member 31 has a downwardly inwardly extending knife edge 36, the knife edges being diametrically opposed along a line perpendicular to the lines joining the pivots 32 with the rollers 33, as shown in FIGURE 5.

The knife edges 36, upon inward pivotal movement of the arcuate lever members 31, are adapted to engage underneath the flange 21 of a container 20 and over the flange of the subjacent and lowermost nested container, as will be clear from FIGURES 3 and 4; knife edges 36 are adapted to extend through opening 37, made in the lower magazine section 28.

A lower pair of diametrically opposed arcuate lever members 38 are mounted underneath frame member 29 around the lower magazine section 28.

Members 38 are pivoted to frame member 29 by means of pivots 32 and their free ends are provided with rollers 39, vertically aligned with the rollers 33. Said free ends of the lever members 38 are urged towards each other by means of a coil spring 40 attached to the lever members 38 by posts 41 (see FIG. 2).

The upper and lower arcuate lever members 31 and 38 are kept in sliding contact with the ring-like frame member 29 by means of channel-shaped brackets 42, secured to said frame member 29 and overlying the arcuate members 31 and 38.

The lower arcuate lever member 38 is provided with inwardly and upwardly extending shelf extensions 43, which are diametrically opposed and which are respectively vertically downwardly spaced from the knife edges 36 and which extend through opening 37 of lower magazine section 28.

A bevelled rocking member 44 is pivoted intermediate its ends by pin 45 in a slot 46 made in bracket 30, such that rocking movement of said rocking member 44 about pin 45 will cause the upper and lower portion of its bevelled edge to alternately engage and spread apart the rollers 33 and 39 of the lever members 31 and 38, respectively, as clearly shown in FIGURE 2.

The lower end of rocking member 44 is provided with a roller 47 engaging a vertical slot 48 made in a upstanding member 49, secured to a horizontally disposed plunger 50.

Plunger 50 is guided for slidable movement by bracket 30 and has at its inner end a roller 51 adapted to engage the lateral notches 17 of the plates 11 of conveyor chain 1, under action of a coil spring 52.

FIGURES 2, 3, and 5 show the position of the various elements of the mechanism when the plunger roller 51 engages the side notch 17 of a plate 11 of the endless conveyor chain 1, the central opening 14 of said plate 11 being then in exact vertical register with the stack of containers 20 within the magazine.

In the position of FIGURES 2, 3, and 5, the plunger 50 is in its right hand limit position; that is, in a position closest to the conveyor chain 1 and the bevelled edge rocking member 45 is in its counterclockwise limit position, whereby the knife edges 36 of the upper arcuate members 31 are in closed position to engage underneath the flange of the lowermost container of the stack within the magazine, whereas the shelf extensions 43 of the lower arcuate lever member 38 are in retracted position, as clearly shown in FIGURE 3.

When plunger roller 51 moves out of lateral notch 17 of plate 11 upon displacement of the conveyor chain 1, the bevelled edge rocking member 44 is caused to pivot to its clockwise limit position, because plunger 50 and upstanding member 49, secured to plunger 50, move to the left (FIGURE 2) and the right hand edge of slot 48 of member 49 pushes roller 47 to the left, said roller 47 being carried by the lower end of actuator 44. Thus the top knife edges 36 retract while the shelf extensions 43 close in to take the position of FIGURE 4. Thus, the stack of containers 20 drop onto the shelf extensions 43 and are supported thereby.

When, under action of spring 52, the plunger roller 51 engages the side notch 17 of the next plate 11 of the conveyor chain 1 upon further displacement of the latter, the bevelled edge rocking member 44 moves again in counterclockwise direction, so that the knife edges 36 move inwardly to engage between the flanges of the lowermost and next lowermost containers of the stack in the magazine.

Upon further counterclockwise movement of the rocking member, the knife edges 36 move further inwardly and the shelf extensions 43 gradually retract to clear the lowermost container, which drops onto the vertically-aligned central opening 14 of the plate 11 of the conveyor chain 1, while the remaining containers of the stack are held by the knife edges 36, as shown in FIGURE 3.

It will be noted in this mechanism that the knife edges 36 positively engage exactly between the flanges of the two lowermost containers of the stack, irrespective of the fact that the containers may be nested one within the other to a more or less degree.

The vertical spacing between the shelf extensions 43 and the knife edges 36 are calculated in accordance with the thickness of the flange 21 of the container 20, said flanges having a thickness varying between only very close tolerances.

The knife edges 36 being bevelled, serve also upon insertion between the flanges of the two lowermost containers, to positively separate the nested lowermost container from the next container of the stack, ensuring positive dropping of the lowermost container.

Because the mechanism is directly operated by the conveyor chain 1, there is achieved perfect register of the central opening 14 of the conveyor plate 11 with the stack of containers within the magazine. Thus, the dispensing mechanism drops containers in the openings 14 of the conveyor 1 without failure and always in proper position.

In this connection, it should be noted that only a very slight misalignment of central opening 14 of plate 11 with respect to the stack of containers in the magazine, would be sufficient to cause misplacement of the lightweight container within opening 14 of plate 11.

The empty container is carried by the endless chain 1 to the filling station 7; said filling station is of conventional construction and, for food in powdered form, it includes a hopper 53, containing a reserve of the powdered food material, which has a spout 54 provided with suitable valve mechanism, actuated by air cylinders 55 in such a way as to dispense a measured amount of powdered material within the empty container in register with spout 54.

No further details of this construction are shown, as this is conventional in the art.

Figure 10:
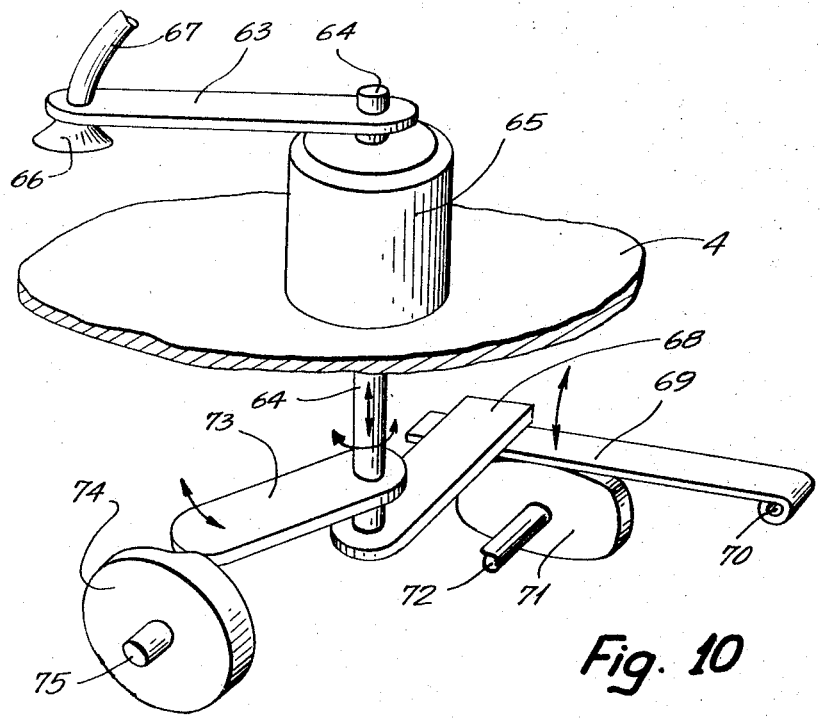
FIGURE 10 is a perspective view of the cap transfer mechanism.

The conveyor chain 1 then moves the filled container 20 to the capping station 8. The elements at said capping station are shown in FIGURES 8, 9, and 10.

A cylindrical cap magazine 56 is inserted within a hole made in the table top 4 and slightly protrudes upwardly therefrom, being removably retained by a ring 57 secured to the magazine and bearing on a plate 58. Button 58′ locates the magazine in proper angular position.

The stack of caps 22 is supported by a disc 59, in turn urged upwardly by a compression spring 60 bearing against the bottom of the magazine. The magazine has a wide longitudinal slot 61 extending laterally thereof for clearing the tabs 23 of the caps 22.

The topmost cap 22 is retained by radially inwardly projecting short fingers 62, secured to the upper edge of the magazine.

Referring to FIGURE 10, a horizontally disposed radial arm 63 is secured at one end to a vertical shaft 64, which is rotatably and slidably mounted within a journal box 65 secured to the table top 4.

The outer end of radial arm 63 carries a downwardly extending suction cup 66 in communication with rubber tube 67, in turn connected to a source of vacuum. The lower end of vertical shaft 64 carries a finger 68 disposed underneath table top 4, and which bears on a leaf spring 69 pivoted at its other end 70 to a suitable pivot member secured to the table.

Leaf spring 69 is caused to pivot in a vertical angular movement under the action of a cam 71 driven by shaft 72. Vertical shaft 64 is further provided with a radial finger 73, rigidly secured thereto, and the outer end of which is in engagement with a cam 74 driven by shaft 75.

Cap magazine 56 is located on one side of conveyor chain 1 and vertical shaft 64 is located on the same side and at such a distance that the suction cup 66, upon horizontal angular movement of the radial arm 63, will move between a position in register with the center of the topmost cap in the magazine to a position in register with the centre of a filled container 20 located in the conveyor plate 11 at the capping station 8.

A coil spring (not shown), located in journal box 65 and attached to the vertical shaft, tends to lower said vertical shaft and also to rotate the same in a position in which radial arm 63 locates suction cup 66 above cap magazine 56.

In this position, the vacuum line is open; the vertical shaft 64 is allowed to move downwardly under action of the spring 69 and cam 71, whereby suction cup 66 engages the topmost cap in the stack in cap magazine 56.

The vertical shaft is then moved upwardly under action of cam 71 and, simultaneously, the vertical shaft is rotated by cam 74 and radial finger 73 to bring the suction cup and cap in vertical register with the filled container at the capping station.

The vertical shaft is again lowered under action of cam 71 and the vacuum is cut out to release the cap, which is deposited on top of the filled container. The suction cup is then returned in vertical alignment with the cap magazine 56.

It will be noted that only one cap at a time can be grasped by the suction cup, due to the fact that the topmost cap is lifted upwardly from the stack and that said topmost cap has to be bent slightly to clear the retaining fingers 62 of the magazine 56.

Figure 11:
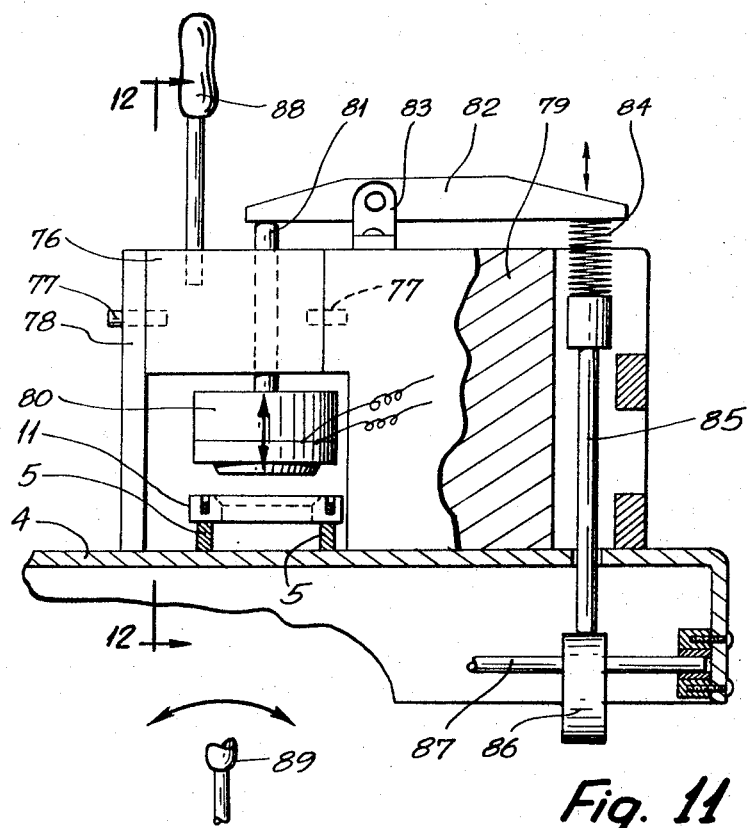
FIGURE 11 is a side elevation, partially in section, of the cap heat sealing means.
Figure 12:
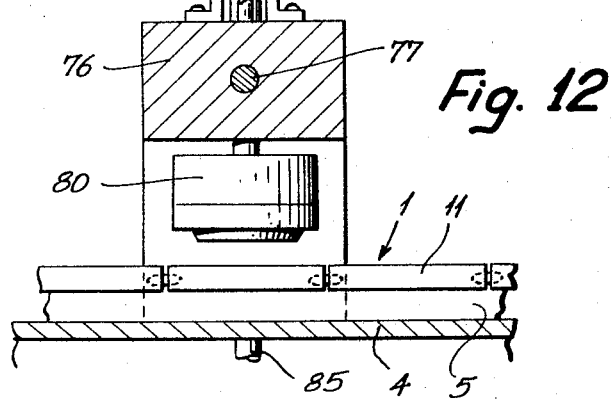
FIGURE 12 is a cross section, taken along line 12—12 of FIGURE 11.

The filled container with its cap thereon is then transported by conveyor chain 1 to the sealing station 9, the constituting elements of which are shown in FIGURES 11 and 12.

A block 76 is pivotally supported by pins 77 and support brackets 78 and 79 above the conveyor chain at the sealing station. A cylindrical heating block 80, enclosing an electric heating element, is secured to the lower end of a stem 81, which passes through block 76 and is vertically slidable therein. Spring means (not shown) within the block 76, and connected to the stem 81, normally maintains the block 80 in a raised position.

Brackets 78 and 79 are secured to the table top 4 above the same. A rocking lever 82 is pivoted intermediate its ends on support 83 secured to the bracket 79 on top thereof.

One end of the rocking lever 82 bears against the upper end of stem 81, while the other end thereof is actuated by a spring 84 and a plunger 85, in turn bearing against a cam 86 mounted on driving shaft 87.

Upon a filled container provided with a cap reaching the sealing station 9, cam 86 causes upward movement of plunger 85, which rocks lever 82 which causes lowering of heating block 80 in pressing engagement with the cap 22 and flange 21 of the filled container at the sealing station. The heating block 80 seals the cap onto the container; the heating block 80 is then allowed to raise, thus clearing the container and conveyor chain which moves a further step.

The heating block 80, and more particularly its underface, is made easily accessible for cleaning, repair, and the like, by pivoting block 76 about pins 77 by means of a handle 88 secured to said block 76.

The conveyor chain 1 is moved in an intermittent or step-like manner and, during the time the chain is stationary, the container dispensing operation, the filling operation, the capping operation and the sealing operation are effected substantially simultaneously at spaced plates 11 of the chain 1.

The drive for the chain 1 and for the other mechanism previously described, is of conventional construction and, therefore, has not been shown in detail. This drive comprises, as shown in FIGURE 1, an electric motor 89, controlled by switch 90 and driving a speed reducing unit 91, the output shaft of which is connected to a cross shaft 92 which drives the conveyor chain in a step-like manner by means of sprocket gear 93, sprocket chain 94 and a clutching unit, not shown, provided with means for rotating the chain in a step-like manner.

Cross shaft 92 is provided with a cam 95, causing reciprocating movement of a lever 96 pivotally connected to the piston rod of an air suction cylinder 97, which provides the source of vacuum for suction cup 66.

The production and control of compressed air for air cylinders 55 operating the filling mechanism, are obtained by the assemblies 98 of valves and cylinder units operated by cams 99 mounted on a cross shaft driven through sprocket gears and sprocket chain system 100 by cross shaft 92.

While a preferred embodiment in accordance with the invention has been illustrated and described, it is understood that various modifications may be resorted to without departing from the spirit and scope of the appended claims.

What I claim is:

1. In a container filling and capping machine having a rotatable endless conveyor chain having container receiving sockets therein, a container dispenser, means for dispensing from said dispenser one container at the time and depositing the same in the sockets of said conveyor chain, a material hopper, means for intermittently operating a dispensing valve positioned beneath said material hopper to cause predetermined quantities of the material from said hopper to be deposited in the containers carried by said conveyor chain, means for intermittently rotating the conveyor chain to consecutively carry the filled containers into a cap-receiving position, a cap feed mechanism, means for intermittently operating the same to cause a cap to be delivered onto a filled container carried by the conveyor chain, means for heat sealing the cap onto the filled container and means for discharging the filled and capped containers from the chain, wherein said container dispenser includes a magazine disposed over said conveyor chain and adapted to house a vertical stack of nested containers, and said container dispensing means include mechanism at the bottom of said magazine operable to separate the lowermost container from the stack and allow the same to drop into a socket of said conveyor chain in register with said stack, a spring-pressed plunger connected to said mechanism for operating the same, said plunger mounted for engaging the side of said conveyor chain, the latter having spaced notches in the side thereof each associated with one socket thereof and in the path of said plunger to be engaged thereby and to operate the same upon a socket of said conveyor chain coming into register with said container stack.

2. In a container filling and capping machine as claimed in claim 1, wherein said mechanism includes an upper pair and a lower pair of arcuate lever members pivotally mounted at one end surrounding the lower containers of said stack, spring means connecting said upper pair and said lower pair, respectively, and urging the arcuate members of the respective pairs towards each other, a pivotally mounted rocking member connected to and actuated by said plunger for rocking movement to selectively and alternately engage the free ends of the upper pair and lower pair of said arcuate lever members, so as to alternately spread apart said pairs of arcuate lever members, said lower pair of arcuate lever members having diametrically opposed radially inwardly extending shelf extensions, engageable with the lowermost container of said stack in the closed position of said lower pair of arcuate lever members to hold said stack within said magazine, said upper pair of arcuate lever members having diametrically opposed radially inwardly extending knife edges adapted to engage between the lowermost and next lowermost container of said stack in the closed position of said upper pair of lever members.

3. In a container filling and capping machine as claimed in claim 1, wherein said cap feed mechanism includes a magazine for containing a stack of caps with the uppermost cap accessible, a shaft mounted for vertical and rotational movement, a radial arm carried by the upper end of said shaft, a suction cap carried by the free end of said radial arm, radial fingers carried by the lower end portion of said vertical shaft, first cam means engageable with one radial finger to rotate said shaft, a leaf spring engaging the underface of the other radial finger, and second cam means engaging the underface of said leaf spring for moving the same in a vertical angular movement to thereby raise and lower said vertical shaft, said first and second cam means operating said vertical shaft to cause said suction cup to be lowered in register with the uppermost cap of said stack in said magazine, adhere to said cap, raise the same and transfer the same in vertical register with a filled container in a cap-receiving position and lower said cap to deposit the same on said container.

4. In a conntainer filling and capping machine as claimed in claim 1, wherein said means for heat sealing the cap to the filled container, comprises a heating block, a vertical stem to the lower end of which said heating block is secured, a guide block in which said stem is slidably mounted, means for raising and lowering said stem, a support pivotally supporting said guide block over said conveyor chain and manual means for pivoting said guide block, in order to tilt said heating block to render its underface accessible for cleaning or repair.

5. In a container filling and capping machine as claimed in claim 1, wherein said means for discharging the filled and capped containers from the chain, include radially outwardly projecting spaced bosses on the periphery of the wheel supporting one end of said rotatable conveyor chain, said bosses engaging said sockets from underneath, as said chain moves around said wheel, to thereby eject containers from said sockets.

6. A system for dispensing shallow tapered containers having an outward flange and adapted to be nested one within the other to form a stack, in combination with a rotatable endless conveyor chain having container-receiving sockets, said system including a container stack magazine mounted above said chain and mechanism for dispensing from said magazine one container at the time and depositing the same in the sockets of said conveyor chain, said mechanism located at the bottom of said magazine, operable to separate the lowermost container from the stack and allow the same to drop into a socket of said conveyor chain in register with said stack, an actuator member connected to said mechanism for operating the same, said actuator member mounted for direct engagement with said conveyor chain, and spaced means on said conveyor chain, each associated with one socket thereof and engageable with said actuator member to operate the same upon a socket of said conveyor chain coming into register with said container stack.

7. A container dispenser as claimed in claim 6, wherein said actuator member consists of a spring-pressed plunger mounted for engagaing the side of said conveyor chain and said spaced means on said conveyor chain consist of notches made in the side thereof, each associated with a socket of said conveyor chain.

8. In a mechanism as claimed in claim 7, wherein said mechanism includes an upper and lower pair of vertically spaced and aligned arcuate levers surrounding the lower portion of said stack, said levers pivoted at one end, spring means urging the free ends of each pair of levers towards each other for said levers to take a closed position, a rocking member having a bevelled edge pivoted intermediate its ends in a position so that the upper portion of said rocking member engages between the free ends of the upper pair of levers and the lower portion of said rocking member engages between the free ends of the lower pair of levers, means connecting said plunger to said rocking member for rocking movement of said rocking member upon displacement of said plunger, so that said upper pair of levers close and open, while said lower pair of levers open and close during said rocking movement, said lower pair of levers having radially inwardly protruding diametrically opposed shelf members adapted to engage underneath the flange of the lowermost container of said stack in the closed position of said lower levers and to clear said flange in the open position of said lower levers, said upper levers having radially inwardly projecting diametrically oppositely disposed knife edge members adapted to engage under the flange of the next lowermost container of said stack in the closed position of said upper levers and to clear said flange in the open position of said upper levers.

References Cited by the Examiner

UNITED STATES PATENTS

| | | | |
|---|---|---|---|
| 1,913,743 | 6/1933 | Borchert | 53—282 |
| 2,248,479 | 7/1941 | Miller | 221—223 XR |
| 2,602,556 | 7/1952 | Sheehan | 221—223 |
| 2,841,938 | 7/1958 | Speroni | 53—282 |
| 2,972,216 | 2/1961 | Schmidt | 53—281 |
| 2,997,832 | 8/1961 | Ludwig | 53—306 |
| 3,242,636 | 3/1966 | Evanson et al. | 53—59 XR |

GRANVILLE Y. CUSTER, JR., *Primary Examiner.*